US008867329B2

(12) United States Patent
Hui et al.

(10) Patent No.: US 8,867,329 B2
(45) Date of Patent: Oct. 21, 2014

(54) ALLOWING A SINGLE TRANSMITTER TO TRANSMIT MULTIPLE DATA FRAMES IN OFDM COMMUNICATION NETWORKS

(75) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 13/563,545

(22) Filed: Jul. 31, 2012

(65) Prior Publication Data

US 2013/0250953 A1 Sep. 26, 2013

Related U.S. Application Data

(60) Provisional application No. 61/614,975, filed on Mar. 23, 2012.

(51) Int. Cl.
*H04J 11/00* (2006.01)

(52) U.S. Cl.
USPC .......................................................... 370/207

(58) Field of Classification Search
CPC .... H04L 5/0007; H04L 5/0044; H04L 5/0023
USPC .................. 370/203, 204, 206, 207, 208, 210
See application file for complete search history.

(56) References Cited

U.S. PATENT DOCUMENTS

| | | | | |
|---|---|---|---|---|
| 6,072,773 | A | 6/2000 | Fichou et al. | |
| 6,118,791 | A | 9/2000 | Fichou et al. | |
| 6,192,248 | B1 | 2/2001 | Solondz | |
| 6,347,071 | B1 * | 2/2002 | Cupo et al. | 370/203 |
| 6,424,624 | B1 | 7/2002 | Galand et al. | |
| 6,934,340 | B1 | 8/2005 | Dollard | |
| 7,327,697 | B1 | 2/2008 | Friday et al. | |

(Continued)

FOREIGN PATENT DOCUMENTS

| | | | |
|---|---|---|---|
| EP | 1388954 | A2 | 2/2004 |
| GB | 2443009 | A | 4/2008 |
| WO | WO-0239631 | A1 | 5/2002 |
| WO | WO-2008144323 | A1 | 11/2008 |

OTHER PUBLICATIONS

Rummery, et al., "Notification of Transmittal of the International Search Report and the Written Opinion of the International Searching Authority, or the Declaration", Patent Cooperation Treaty, International Application No. PCT/US2013/033485, mailed Nov. 8, 2013, 14 pages, European Patent Office, Rijswijk, The Netherlands.

(Continued)

*Primary Examiner* — Raj Jain
(74) *Attorney, Agent, or Firm* — Edwards Wildman Palmer LLP; James M. Behmke; Stephen D. LeBarron

(57) ABSTRACT

In one embodiment, a transmitting device may determine a first data frame to a first destination and a second data frame to a second destination, and may assign subcarriers in a non-overlapping arrangement to the first and second data frames. Once assigned, the transmitting device may augment a transmission physical (PHY) header with a destination and tone map tuple for each of the first and second destinations, and transmits the transmission with the first and second data frames simultaneously on the assigned subcarriers.

23 Claims, 9 Drawing Sheets

(56) References Cited

U.S. PATENT DOCUMENTS

| | | | | |
|---|---|---|---|---|
| 7,352,688 | B1 | 4/2008 | Perahia et al. | |
| 7,352,718 | B1 | 4/2008 | Perahia et al. | |
| 7,359,311 | B1 | 4/2008 | Paranjpe et al. | |
| 7,466,981 | B1 | 12/2008 | Abdelhamid et al. | |
| 7,535,819 | B1 * | 5/2009 | Larsson et al. | 370/208 |
| 7,593,356 | B1 | 9/2009 | Friday et al. | |
| 7,616,604 | B2 | 11/2009 | Abdelhamid et al. | |
| 7,649,830 | B2 * | 1/2010 | Jeon et al. | 370/203 |
| 7,724,650 | B2 | 5/2010 | Karam | |
| 7,787,897 | B2 | 8/2010 | Banh et al. | |
| 7,884,763 | B2 | 2/2011 | Na et al. | |
| 7,925,268 | B2 | 4/2011 | Sanders et al. | |
| 7,995,525 | B1 | 8/2011 | Perahia et al. | |
| 8,031,786 | B2 | 10/2011 | Wang et al. | |
| 8,040,831 | B2 | 10/2011 | Kurtz et al. | |
| 8,068,552 | B2 | 11/2011 | Wang et al. | |
| 8,073,489 | B2 | 12/2011 | Liu et al. | |
| 8,082,347 | B2 | 12/2011 | Abdelhamid et al. | |
| 8,130,875 | B2 | 3/2012 | Liu et al. | |
| 8,134,503 | B2 | 3/2012 | Na et al. | |
| 8,145,272 | B2 | 3/2012 | Wang et al. | |
| 8,218,677 | B2 | 7/2012 | Jin et al. | |
| 8,218,969 | B2 | 7/2012 | Forghieri et al. | |
| 8,249,509 | B2 | 8/2012 | Wang et al. | |
| 8,374,105 | B1 | 2/2013 | Perahia et al. | |
| 8,379,524 | B1 | 2/2013 | Jacobs et al. | |
| 8,411,807 | B1 | 4/2013 | Rangarajan et al. | |
| 8,416,802 | B2 | 4/2013 | Jin et al. | |
| 8,656,244 | B1 * | 2/2014 | Chang | 714/752 |
| 2005/0195732 | A1 * | 9/2005 | Huh et al. | 370/206 |
| 2006/0193391 | A1 * | 8/2006 | Borran et al. | 375/260 |
| 2006/0294246 | A1 | 12/2006 | Stieglitz et al. | |
| 2007/0026868 | A1 | 2/2007 | Schulz et al. | |
| 2009/0190535 | A1 | 7/2009 | Hassan et al. | |
| 2009/0310692 | A1 | 12/2009 | Kafle et al. | |
| 2010/0142540 | A1 | 6/2010 | Matheney et al. | |
| 2010/0162329 | A1 | 6/2010 | Ford et al. | |
| 2011/0026630 | A1 | 2/2011 | Stager et al. | |
| 2011/0236013 | A1 | 9/2011 | Gazzola et al. | |

OTHER PUBLICATIONS

Rummery, et al., "Notification of Transmittal of the International Search Report and the Written Opinion of the International Searching Authority, or the Declaration", Patent Cooperation Treaty, International Application No. PCT/US2013/033522, mailed Nov. 8, 2013, 15 pages, European Patent Office, Rijswijk, The Netherlands.

Pettersson, et al., "Invitation to pay Additional Fees, and Where Applicable, Protest Fee", Patent Cooperation Treaty, PCT/US2013/033485, mailed Aug. 20, 2013, 5 pages, European Patent Office, Rijswijk, Netherlands.

Pettersson, et al., "Notification of Transmittal of the International Search Report and The Written Opinion of the International Searching Authority, or the Declaration", Patent Cooperation Treaty, International Application No. PCT/US2013/033504, mailed Aug. 20, 2013, 9 pages, European Patent Office, Rijswijk, Netherlands.

Pettersson, et al., "Invitation to pay Additional Fees, and Where Applicable, Protest Fee", Patent Cooperation Treaty, PCT/US2013/033522, mailed Aug. 20, 2013, 5 pages, European Patent Office, Rijswijk, Netherlands.

Xu, et al., "Hierarchical Opportunistic Scheduling in Multi-Service OFDMA Networks", International Conference on Wireless Communications, Networking and Mobile Computing, Sep. 2007, pp. 2004-2007, Institute of Electrical and Electronics Engineers, Piscataway, New Jersey.

Jain, et al., "Practical, Real-Time, Full Duplex Wireless", MobiCom '11, Sep. 19-23, 2011, 12 pages, Association for Computing Machinery, Las Vegas, Nevada.

Hui, et al., "Techniques for Use in Orthogonal Frequency Division Multiplexing (OFDM) Communication Networks", U.S. Appl. No. 61/614,975, filed Mar. 23, 2012, 48 pages.

Winter; et al., "RPL: IPv6 Routing Protocol for Low-Power and Lossy Networks", Internet Engineering Task Force, Request for Comments 6550, Mar. 2012, 157 pages.

* cited by examiner

ALLOWING A SINGLE TRANSMITTER TO TRANSMIT MULTIPLE DATA FRAMES IN OFDM COMMUNICATION NETWORKS

RELATED APPLICATION

The present application claims priority to U.S. Provisional Patent Application Ser. No. 61/614,975, filed Mar. 23, 2012, entitled TECHNIQUES FOR USE IN ORTHOGONAL FREQUENCY DIVISION MULTIPLEXING (OFDM) COMMUNICATION NETWORKS, by Hui et al., the contents of which are hereby incorporated by reference.

TECHNICAL FIELD

The present disclosure relates generally to communication networks, and, more particularly, to communication networks employing orthogonal frequency division multiplexing (OFDM).

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. For instance, LLNs communicate over a physical medium that is strongly affected by environmental conditions that change over time, and often use low-cost and low-power transceiver designs with limited capabilities (e.g., low throughput and limited link margin).

To help provide greater throughput and robustness, Orthogonal Frequency Division Multiplexing (OFDM) utilizes additional bandwidth by allowing transmission of multiple data streams across orthogonal subcarriers simultaneously to increase throughput. Adjusting the number of subcarriers and code-rate can vastly change the effective throughput of the link. In addition, Adaptive Tone Mapping is a process that dynamically selects which subcarriers and coding parameters use when transmitting a data frame. The goal of Adaptive Tone Mapping is to maximize throughput and minimize channel utilization by only transmitting on usable subcarriers and optimizing the code-rate without sacrificing robustness. Current techniques for selection, allocation, and utilization of subcarriers, however, offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
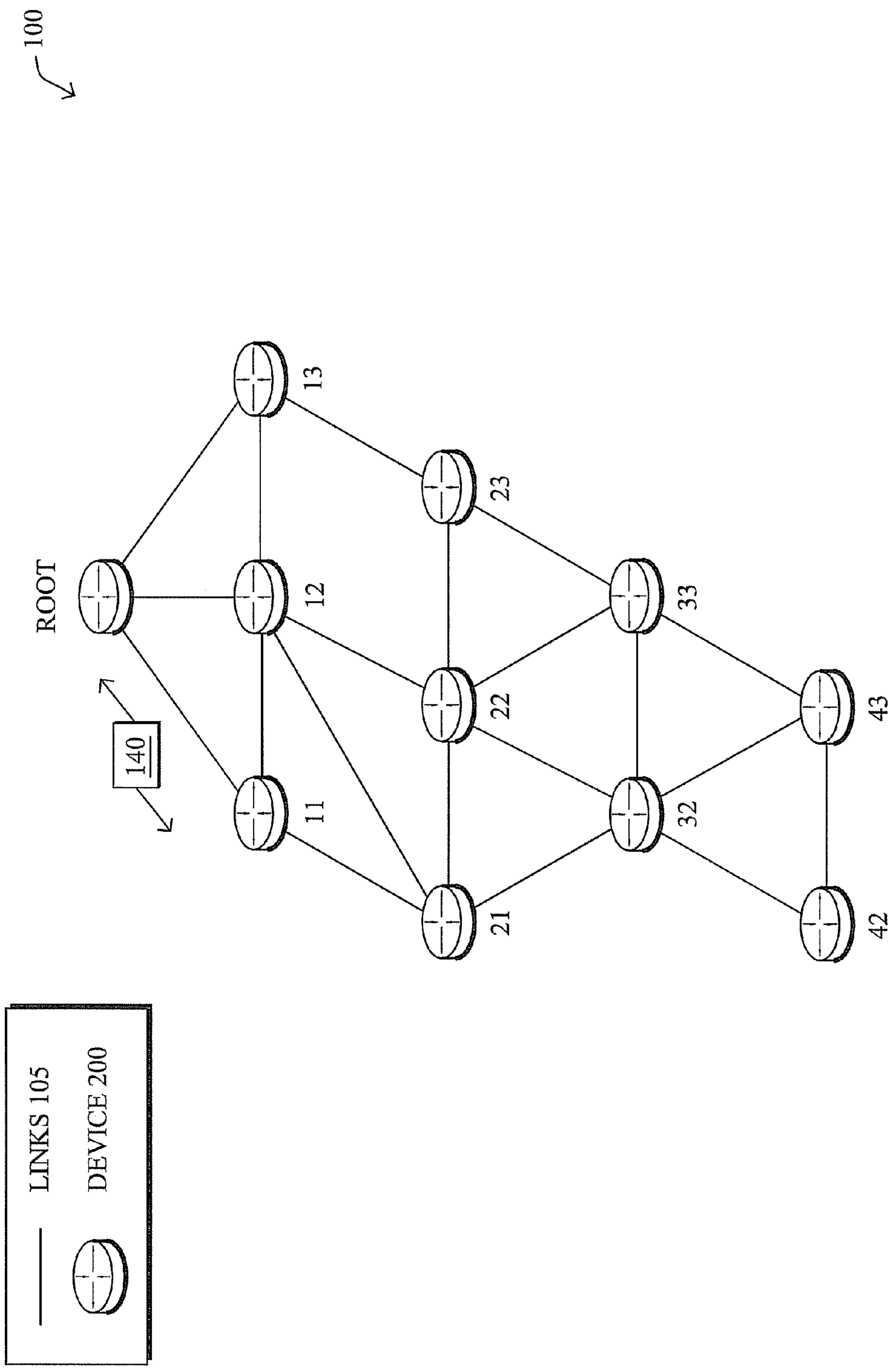
FIG. 1 illustrates an example communication network.

According to one or more embodiments of the disclosure, utilization of available subcarriers is maximized in an OFDM-based LLN by (i) a mechanism that allows a single device to transmit multiple data frames simultaneously to different receivers and (ii) an intelligent subcarrier assignment scheduling and scheduling process that maximizes the channel utilization of the available subcarriers. Specifically, a transmitting device may determine a first data frame to a first destination and a second data frame to a second destination, and may assign subcarriers in a non-overlapping arrangement to the first and second data frames. Once assigned, the transmitting device may augment a transmission physical (PHY) header with a destination and tone map tuple for each of the first and second destinations, and transmits the transmission with the first and second data frames simultaneously on the assigned subcarriers.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
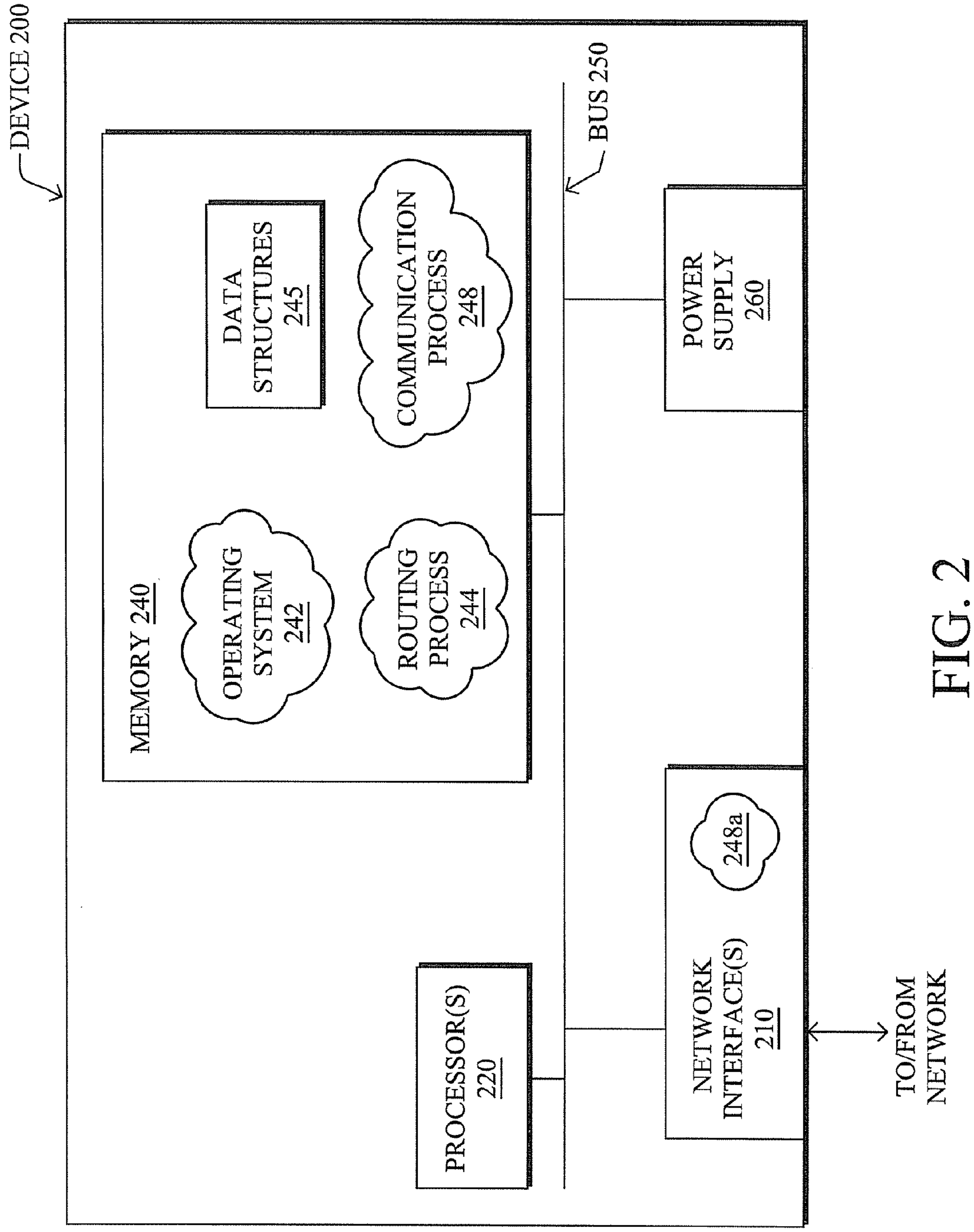
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244 (for routing devices), and a communication process 248, as described herein. Note that while the communication process 248 is shown in centralized memory 240, alternative embodiments provide for the process to be specifically operated within the network interfaces 210, such as a component of the MAC or PHY layer of the interface.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 (on routing-capable devices) contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

As noted, though, LLNs face a number of communication challenges:

1) LLNs communicate over a physical medium that is strongly affected by environmental conditions that change over time. Some examples include temporal changes in interference (e.g., other wireless networks or electrical appliances), physical obstruction (e.g., doors opening/closing or seasonal changes in foliage density of trees), and propagation characteristics of the physical media (e.g., temperature or humidity changes). The time scales of such temporal changes can range between milliseconds (e.g. transmissions from other transceivers) to months (e.g. seasonal changes of outdoor environment).
2) Low-cost and low-power designs limit the capabilities of the transceiver. In particular, LLN transceivers typically provide low throughput. Furthermore, LLN transceivers typically support limited link margin, making the effects of interference and environmental changes visible to link and network protocols.
3) Shared-media communication networks, such as powerline communication (PLC) networks (a type of communication over power-lines), provide an enabling technology for networking communication and can be used for example in AMI networks, and are also useful within home and buildings. Interestingly, PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

To help provide greater throughput and robustness, Orthogonal Frequency Division Multiplexing (OFDM) is being standardized by IEEE 802.15.4g, HomePlug, and IEEE P1901.2. OFDM utilizes additional bandwidth by allowing transmission of multiple data streams across orthogonal subcarrier simultaneously to increase throughput. With optimal erasure codes (e.g., Reed-Solomon), a data frame can be coded across multiple subcarriers to tolerate erasures across different subcarriers and even the complete loss of an individual subcarrier during a packet transmission. In addition, repetition codes may also be applied to provide extremely robust communication, albeit at a very low throughput (known as "ROBO" mode in HomePlug and IEEE P1901.2). Adjusting the number of subcarriers and code-rate can vastly change the effective throughput of the link. For IEEE P1901.2, the effective throughput can range from 2.4 kbps to 34.2 kbps, notably more than an order of magnitude difference.

In addition, Adaptive Tone Mapping is a process that dynamically selects which subcarriers and coding parameters use when transmitting a data frame. The goal of Adaptive Tone Mapping is to maximize throughput and minimize channel utilization by only transmitting on usable subcarriers and optimizing the code-rate without sacrificing robustness. HomePlug and IEEE P1901.2 currently provides mechanisms to send a Tone Map Request (TMREQ) to a neighboring device. HomePlug and IEEE P1901.2 currently require that all TMRs be sent using all available subcarriers to allow the receiver to evaluate the quality on each subcarrier. The quality may be represented as one or more of signal-to-noise-ratio (SNR), bit-error rate, frame-error rate, etc. Upon receiving a TMREQ, a device evaluates the quality of each subcarrier and includes them in a Tone Map Reply (TMREP). Devices maintain a neighbor table indicating the quality of each subcarrier, allowing them to perform tone mapping for subsequent transmissions to optimize throughput.

Current techniques for selection, allocation, and utilization of subcarriers, however, offer room for improvement. Therefore, various techniques are hereinafter shown and described for use with OFDM-based communication networks.

Illustratively, the techniques described herein may be performed by hardware, software, and/or firmware, such as in accordance with the communication process 248, which may contain computer executable instructions executed by the processor 220 (or independent processor of interfaces 210) to perform functions relating to the novel techniques described herein. For example, the techniques herein may be treated as extensions to conventional communication protocols, such as the various protocols that utilize OFDM communication (e.g., wireless protocols, PLC protocols, or other shared media protocols), and as such, may be processed by similar components understood in the art that execute those protocols, accordingly.

Allowing a Single Transmitter to Transmit Multiple Data Frames

Notably, many LLN applications typically utilize multicast communication for delivering messages to multiple LLN devices simultaneously. Multicast communication is often used for group-based configuration, firmware upgrades, and commands.

Moreover, to minimize complexity, transceivers are typically capable of only transmitting or receiving a single data frame at a time. Sending multiple data frames to different receivers requires two separate data frame transmissions. While Adaptive Tone Mapping may only select a subset of the subcarriers when sending one data frame, the transmitter is not capable of utilizing the other available subcarriers to transmit another data frame. This is a critical bottleneck especially since the communication resources are highly constrained.

Orthogonal Frequency Division Multiple Access (OFDMA) is a multi-user version of OFDM, where different users (i.e., devices) are assigned different subsets of the available subcarriers. OFDMA allows different devices transmit simultaneously using different subcarrier subsets. However, OFDMA does not address how a single transmitter can transmit multiple data frames simultaneously to multiple different receivers. Like any Frequency Division Multiplexing system, OFDMA may be used by devices with multiple transmitters to transmit multiple data frames simultaneously. However, this requires additional hardware and increases the device cost.

The techniques herein allow a single transmitter to overlap data frame transmissions to different receivers simultaneously without adding any additional complexity to the transceiver's hardware design, thus increasing the overall performance of the network, increasing throughput, and reducing latency. In particular, the techniques herein apply to existing low-cost LLN devices (e.g., P1901.2) that are designed to perform a single transmission at a time (though, notably, are also applicable to other communication devices with a single transmitter).

Specifically, according to one or more embodiments of the disclosure as described in detail below, utilization of the available subcarriers is maximized in an OFDM-based LLN by (i) a mechanism that allows a single device to transmit multiple data frames simultaneously to different receivers and (ii) an intelligent subcarrier assignment scheduling and scheduling process that maximizes the channel utilization of the available subcarriers. This is notably in contrast to HomePlug and P1901.2, which requires a device to send each data frame one-at-a-time.

Operationally, the techniques below describe how a single transmitter can transmit multiple data frames simultaneously, using existing hardware that was designed only to transmit a single frame at a time. Through intelligent subcarrier assignment and data frame scheduling, a transmitter can maximize use of available subcarriers to maximize throughput and reduce overall latency.

A key insight is that Adaptive Tone Mapping may select only a subset of available subcarriers when transmitting a data frame to a given receiver. When only using those subcarriers, the transmitter is not utilizing the full capabilities of the spectrum. According to the techniques herein, the transmitter may be configured to utilize the unused portions of the spectrum to transmit data to other receivers at the same time.

===Including Multiple Tone Map Fields===

A first aspect of the techniques herein involves including a Tone Map fields for each of the data frames that are transmitted simultaneously. Existing OFDM-based systems (e.g., HomePlug and IEEE P1901.2) include a Tone Map field in the PHY header, indicating what subcarriers are used when transmitting the data portion of the frame. After receiving the PHY header, the receiver reconfigures itself to decode data received on the active subcarriers. However, when transmitting different data frames to different receivers, each receiver needs to know what subcarriers to use to decode the data.

Figure 3:
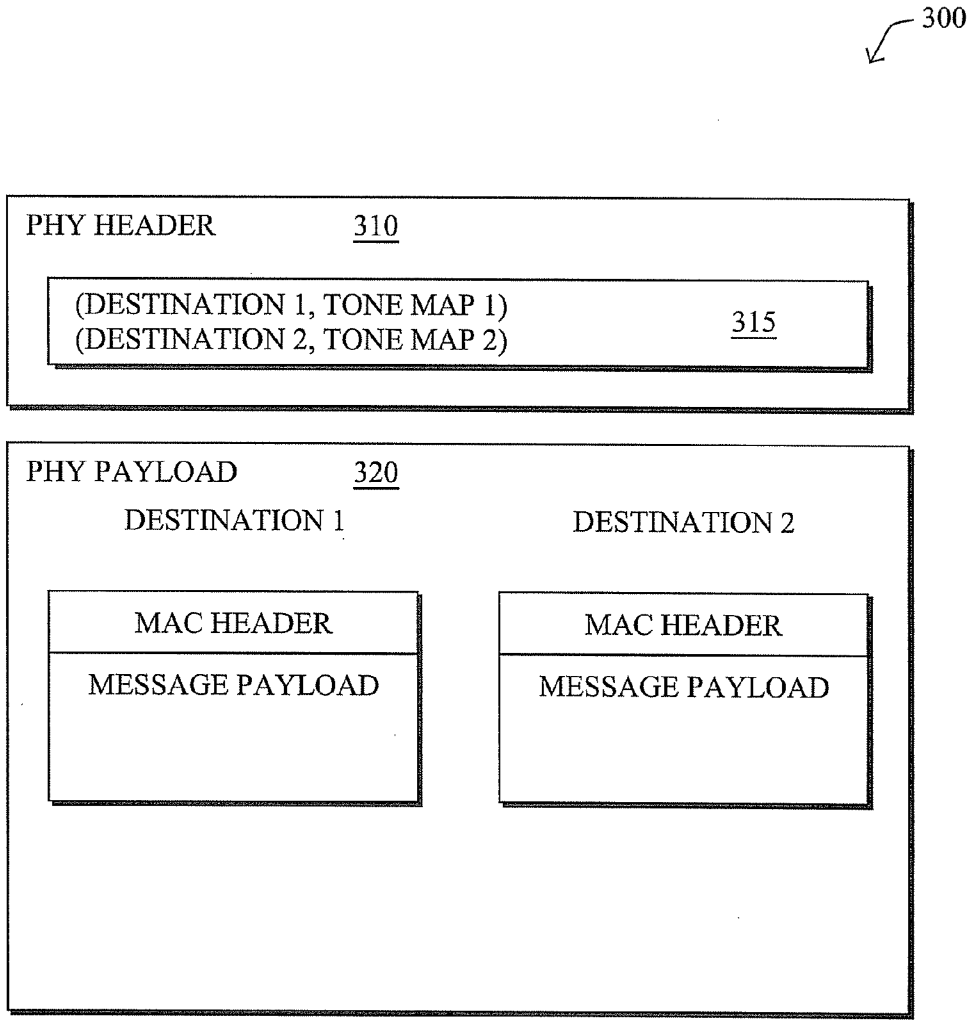
FIG. 3 illustrates an example of a message.

As shown in FIG. 3, to support communicating with multiple receivers in a single transmission 300, the techniques herein augment the PHY header 310 (Frame Control Header (FCH)) to include a list of (Destination Address, Tone Map) tuples 315. In contrast, existing systems (e.g., HomePlug and P1901.2) place the destination address in the MAC header, which is transmitted as part of the PHY payload 320. By including the Destination Address in the FCH, receivers can determine whether or not a transmission is intended for them and what Tone Map to use for receiving a data frame on their portion of the transmission.

Figure 4A:
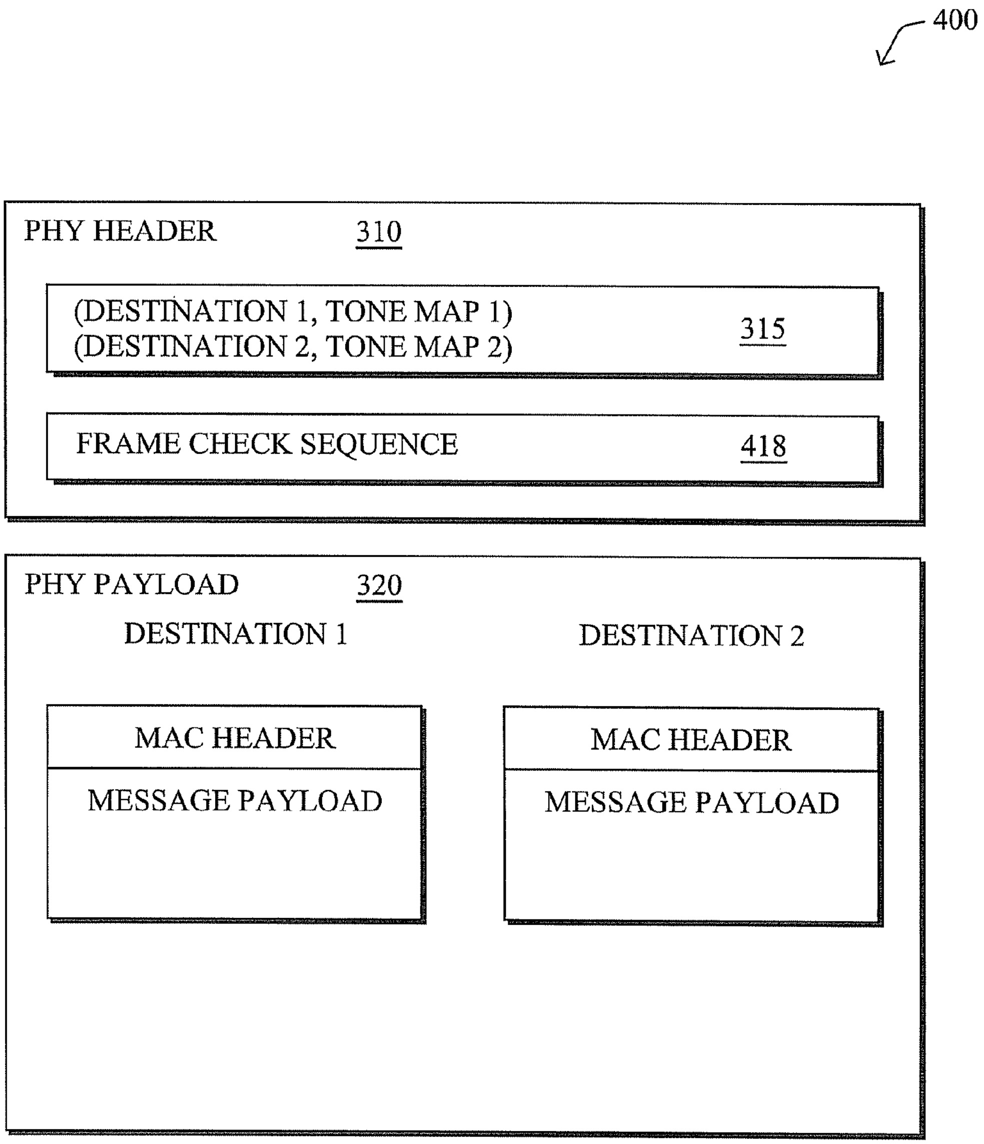
FIGS. 4A-4B illustrate other examples of a message.
Figure 4B:
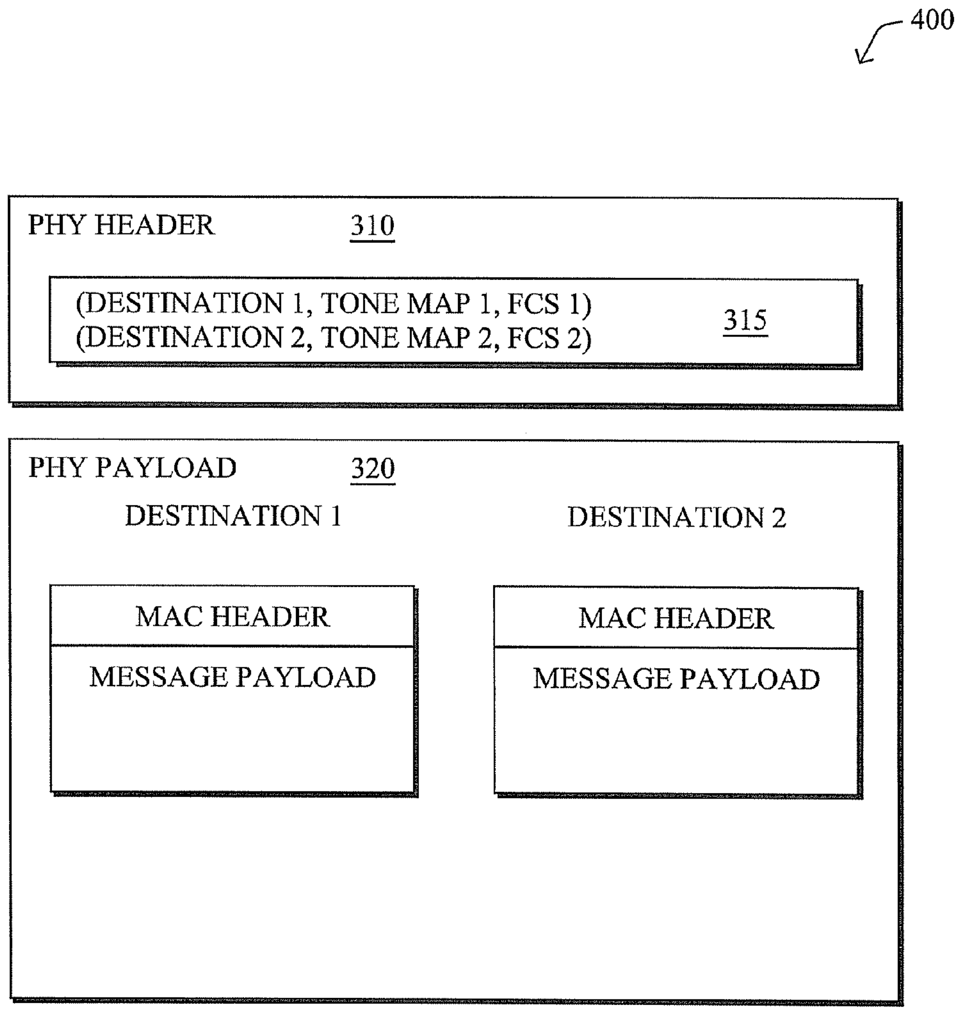

Existing systems place a Frame Check Sequence (FCS) to protect the integrity of the FCH. In one embodiment, as shown in FIG. 4A, devices can protect the entire FCH of a message 400 using a single FCS 418, minimizing the overhead of including a FCH, but any error in the FCH can prevent a receiver from properly reining its data frame. In another embodiment, as shown in FIG. 4B, devices can augment the tuple list 315 with (Destination Address, Tone Map, FCS) tuples. While including separate FCS values increases overhead, it allows a receiver to continue receiving the data portion even if a single bit error has corrupted FCH information for other destinations.

Note that to provide backwards compatibility with existing systems, devices may include dynamic negotiation to discover what neighbors are capable of supporting the extended FCH. In one embodiment, the capability can be provided in a newly defined TMREP that is generated by devices that implement this invention.

===Subcarrier Assignment for Simultaneous Transmissions===

A second aspect of the techniques herein involves having a device intelligently assign subcarriers when transmitting two or more data frames simultaneously.

When determining the subcarrier subset when sending unicast transmissions at different times to two different receivers, the optimal subcarrier subsets may overlap and share a number of subcarriers. Assume that the transmission times for sending these unicast transmissions is Ta and Tb. If the two subcarrier subsets do not overlap, then the two transmissions occur simultaneously and the overall transmission time can be reduced to max(Ta,Tb)<Ta+Tb.

Figure 5A:
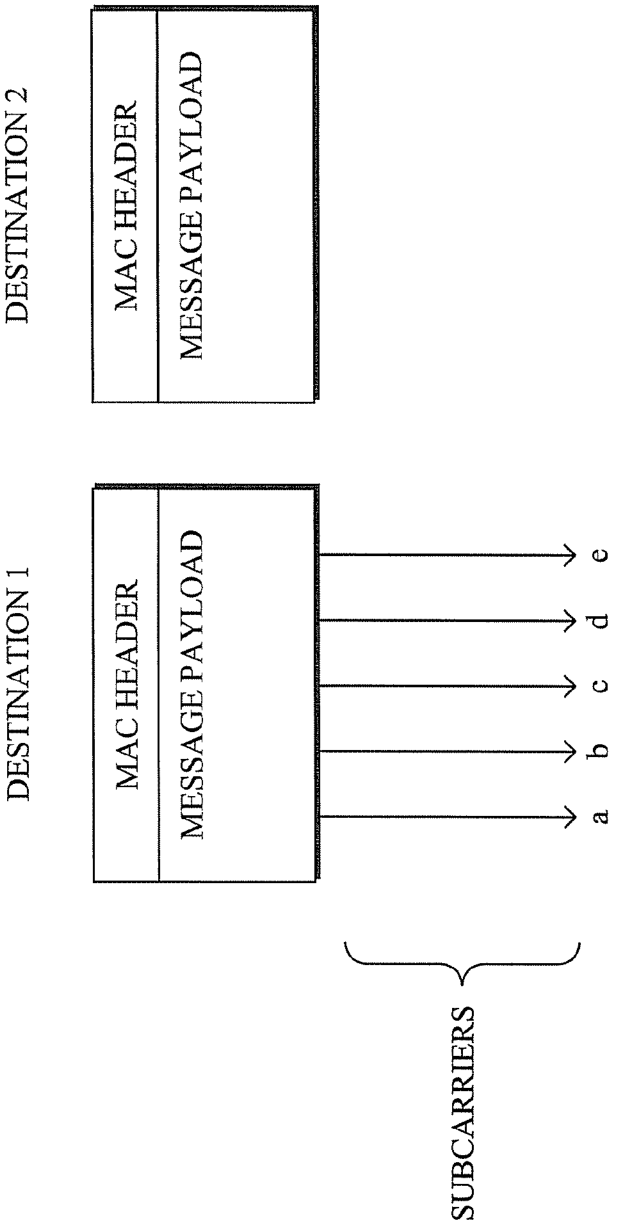
FIGS. 5A-5C illustrate examples of message transmissions.
Figure 5B:
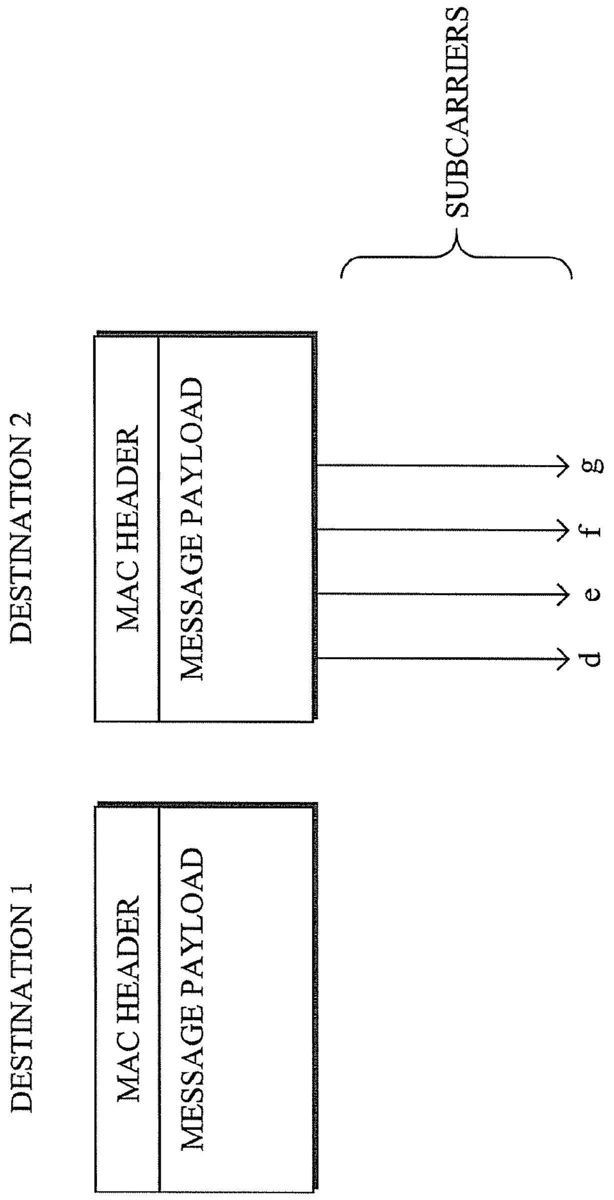
Figure 5C:
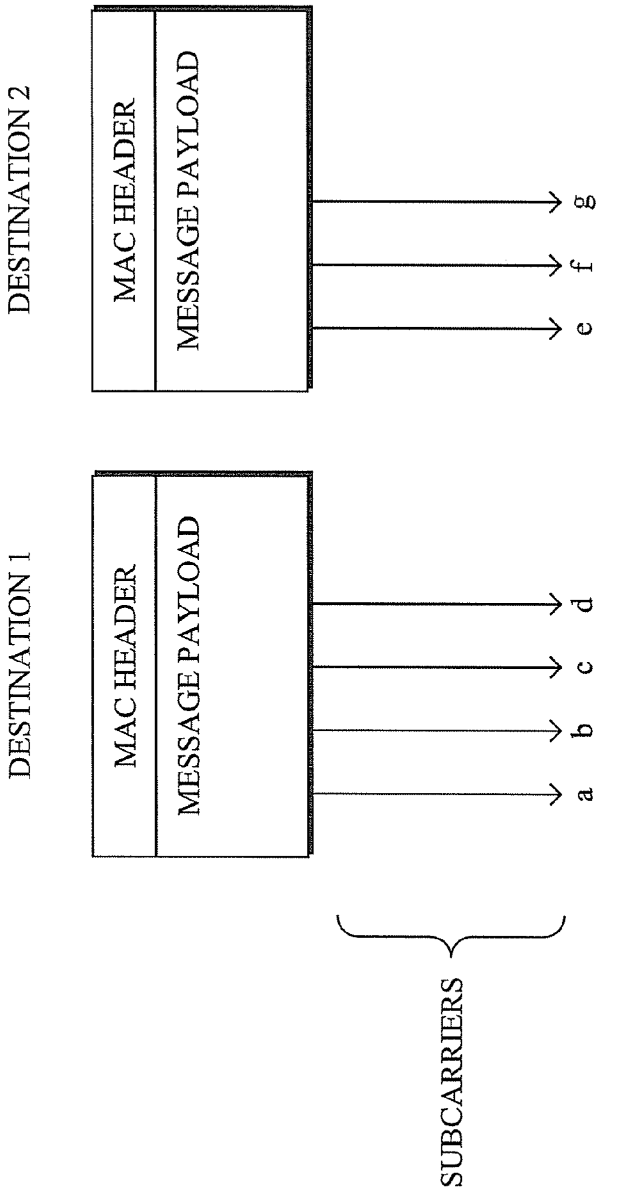

If the two subcarrier subsets overlap, then the transmitter must assign each of the shared subcarriers to a single receiver. For example, as shown in FIGS. 5A-5C, assume we have five subcarriers for A ("a-e") and four subcarriers for B ("d-g"), and A and B share two subcarriers (d and e). The techniques herein can either (i) transmit the packets individually, as shown in FIGS. 5A and 5B respectively, taking Ta+Tb time or (ii) transmit them simultaneously by assigning four subcarriers to A and three subcarriers to B and taking max(1.25*Ta, 1.33*Tb), as shown in FIG. 5C. In other words, the gain comes from the fact that the techniques herein can utilize seven subcarriers simultaneously in one transmission rather than only five subcarriers for the first one and four subcarriers for the second one.

In addition to the normal considerations for Adaptive Tone Mapping (e.g., subcarrier channel quality), the transmitter also takes into account the transmission times for the different data frames. The optimal choice occurs when the simultaneous transmissions all have the same transmission time, since this ensures maximum usage of the available spectrum. For example, if data frame Fa is larger than data frame Fb, more subcarriers could be assigned to Fa so that the difference in transmission times between Fa and Fb is minimized.

Note that if the subcarrier subsets between two receivers are identical, then simultaneous transmissions may not provide much benefit. In particular, transmitting the data frames independently back-to-back as opposed to dividing the subcarriers between the to different data frames would yield the same overall transmission time. Using simultaneous transmissions is most beneficial when two receivers utilize one or more non-overlapping subcarriers.

===Scheduling Simultaneous Transmissions===

A third aspect of the techniques herein involves having a device intelligently schedule multiple transmissions to reduce the overall communication overhead.

When multiple frames are enqueued, a device has the opportunity to intelligently choose what data frames to transmit simultaneously. Recall that when the optimal subcarrier subsets for two different data frames are identical, there is no benefit in transmitting the data frames simultaneously. For this reason, the scheduler should attempt to combine data frames where the subcarrier subsets differ. The amount of time savings will depend on the number of subcarriers that are not shared between the different data frames. As a result, the scheduler may attempt to combine data frames that have the most unshared subcarriers.

Also recall that the maximum efficiency occurs when the difference in transmission times between the data frames is as small as possible, maximizing the utility of all subcarriers during the simultaneous transmission. As a result, the scheduler may also attempt to combine data frames that result in the minimum difference in transmission time when using the optimal subcarrier assignment.

Indeed, there is a tradeoff between optimal subcarrier utilization and communication delay. A policy may be used to prevent data frames from being arbitrarily delayed. The data frame itself may also include an indicator to indicate how much communication delay it is willing to tolerate.

Figure 6:
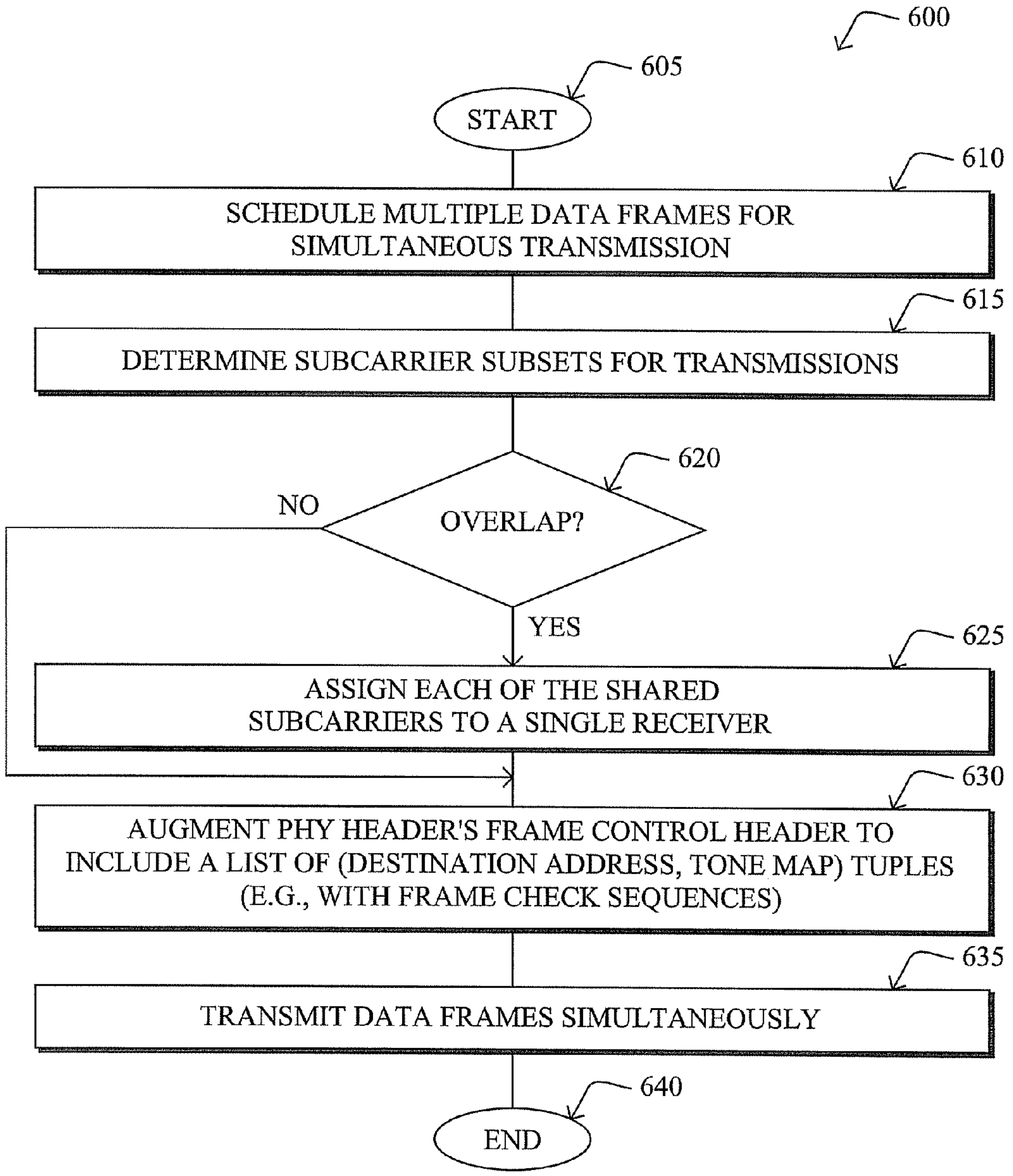
FIG. 6 illustrates an example simplified procedure for allowing a single transmitter to transmit multiple data frames in an OFDM-based communication network.

FIG. 6 illustrates an example simplified procedure 600 for allowing a single transmitter to transmit multiple data frames in an OFDM-based communication network in accordance with one or more embodiments described herein, particularly from the perspective of a transmitting device. The procedure 600 may start at step 605, and continues to step 610, where, as described in greater detail above, the transmitting device may schedule multiple data frames for simultaneous transmission, and may determine (assign) subcarrier subsets for transmissions in step 615, as described above. If there is any overlap of the subcarriers in step 620, then in step 625 the device may assign each of the shared subcarriers to a single receiver. Once the subcarriers have been assigned, then in step 630 the transmitting device may augment the PHY header's frame control header to include a list of (destination address, tone map) tuples (e.g., with frame check sequences, as noted above), and the transmission may be transmitted in step 635, simultaneously carrying the data frames. The procedure illustratively ends in step 640 for this set of data frames.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a single transmitter to transmit multiple data frames in an OFDM-based communication network. In particular, in the techniques herein, a device maximizes the utilization of available subcarriers in an OFDM-based LLN, increasing overall throughput, and reducing overall and/or average latency. Increasing throughput and reducing latency is critical in highly-constrained environments, such as P1901.2. By allowing a device to transmit multiple data frames simultaneously, combined with intelligent scheduling and subcarrier assignment, the techniques herein allow a device to utilize as many available subcarriers as possible in a single transmission activity.

While there have been shown and described illustrative embodiments of techniques for use with OFDM-based communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

determining, at a transmitting device, a first data frame to a first destination and a second data frame to a second destination;

assigning subcarriers in a non-overlapping arrangement to the first and second data frames;

augmenting a transmission physical (PHY) header with a destination and tone map tuple for each of the first and second destinations; and transmitting the transmission with the first and second data frames simultaneously on the assigned subcarriers.

2. The method as in claim 1, further comprising:

providing a frame check sequence within the PHY header for the entire transmission.

3. The method as in claim 1, further comprising:

providing an individual frame check sequence within the PHY header for each destination and tone map tuple within the transmission.

4. The method as in claim 1, further comprising:

determining that the first and second destination devices are capable of receiving transmissions with data frames on assigned subcarriers prior to assigning subcarriers in a non-overlapping arrangement to the first and second data frames.

5. The method as in claim 1, further comprising:

determining that one or more subcarriers for the first data frame and second data frame are overlapping; and, in response, selecting, for each of the one or more overlapping subcarriers, one of either the first or second data frame to which the respective overlapping subcarrier is assigned in the non-overlapping arrangement.

6. The method as in claim 1, further comprising:

determining that the subcarriers for the first data frame and second data frame are completely overlapping; and, in response, transmitting the first and second data frames independently.

7. The method as in claim 1, wherein assigning comprises:

assigning the subcarriers proportionally according to a size of the first and second data frames.

8. The method as in claim 1, further comprising:

determining a plurality of data frames; and selecting the first and second frames from the plurality of data frames based on a number of non-overlapping subcarriers between the first and second data frames.

9. The method as in claim 8, further comprising:

selecting the first and second frames from the plurality of data frames based on their having the highest number of non-overlapping subcarriers.

10. The method as in claim 1, further comprising:

determining a plurality of data frames; and selecting the first and second frames from the plurality of data frames based on a minimum difference in transmission time between the first and second data frames.

11. The method as in claim 1, further comprising:

determining a plurality of data frames; and selecting the first and second frames from the plurality of data frames based on an indication of how long of a delay is tolerated by the first and second data frames prior to being transmitted.

12. An apparatus, comprising:

one or more network interfaces to communicate within a computer network;

a processor coupled to the network interfaces and adapted to execute one or more processes; and a memory configured to store a process executable by the processor, the process when executed operable to:

determine a first data frame to a first destination and a second data frame to a second destination;

assign subcarriers in a non-overlapping arrangement to the first and second data frames;

augment a transmission physical (PHY) header with a destination and tone map tuple for each of the first and second destinations; and transmit the transmission with the first and second data frames simultaneously on the assigned subcarriers.

13. The apparatus as in claim 12, wherein the process when executed is further operable to:

provide a frame check sequence within the PHY header for the entire transmission.

14. The apparatus as in claim 12, wherein the process when executed is further operable to:

provide an individual frame check sequence within the PHY header for each destination and tone map tuple within the transmission.

15. The apparatus as in claim 12, wherein the process when executed is further operable to:

determine that the first and second destination devices are capable of receiving transmissions with data frames on assigned subcarriers prior to assigning subcarriers in a non-overlapping arrangement to the first and second data frames.

16. The apparatus as in claim 12, wherein the process when executed is further operable to:

determine that one or more subcarriers for the first data frame and second data frame are overlapping; and, in response, select, for each of the one or more overlapping subcarriers, one of either the first or second data frame to which the respective overlapping subcarrier is assigned in the non-overlapping arrangement.

17. The apparatus as in claim 12, wherein the process when executed is further operable to:

determine that the subcarriers for the first data frame and second data frame are completely overlapping; and, in response, transmit the first and second data frames independently.

18. The apparatus as in claim 12, wherein the process when executed to assign is further operable to:

assign the subcarriers proportionally according to a size of the first and second data frames.

19. The apparatus as in claim 12, wherein the process when executed is further operable to:

determine a plurality of data frames; and select the first and second frames from the plurality of data frames based on a number of non-overlapping subcarriers between the first and second data frames.

20. The apparatus as in claim 19, wherein the process when executed is further operable to:

select the first and second frames from the plurality of data frames based on their having the highest number of non-overlapping subcarriers.

21. The apparatus as in claim 12, wherein the process when executed is further operable to:

determine a plurality of data frames; and select the first and second frames from the plurality of data frames based on a minimum difference in transmission time between the first and second data frames.

22. The apparatus as in claim 12, wherein the process when executed is further operable to:

determine a plurality of data frames; and select the first and second frames from the plurality of data frames based on an indication of how long of a delay is tolerated by the first and second data frames prior to being transmitted.

23. A tangible, non-transitory, computer-readable media having software encoded thereon, the software when executed by a processor operable to:

determine a first data frame to a first destination and a second data frame to a second destination;

assign subcarriers in a non-overlapping arrangement to the first and second data frames;

augment a transmission physical (PHY) header with a destination and tone map tuple for each of the first and second destinations; and transmit the transmission with the first and second data frames simultaneously on the assigned subcarriers.

* * * * *